(12) United States Patent
Park et al.

(10) Patent No.: US 12,247,670 B2
(45) Date of Patent: Mar. 11, 2025

(54) CONTROL VALVE AND COOLING SYSTEM FOR A VEHICLE

(71) Applicants: HYUNDAI MOTOR COMPANY, Seoul (KR); KIA CORPORATION, Seoul (KR)

(72) Inventors: Junghoon Park, Anyang-si (KR); Jongmin Kim, Seoul (KR); WonGi Lee, Hwaseong-si (KR); Kyounghee Kim, Ansan-si (KR); Woo Yong Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 101 days.

(21) Appl. No.: 17/975,305

(22) Filed: Oct. 27, 2022

(65) Prior Publication Data
US 2023/0145604 A1    May 11, 2023

(30) Foreign Application Priority Data
Nov. 11, 2021   (KR) .................. 10-2021-0154444

(51) Int. Cl.
*F16K 11/087*   (2006.01)
*F01P 3/20*     (2006.01)
(Continued)

(52) U.S. Cl.
CPC ............ *F16K 11/0876* (2013.01); *F01P 3/20* (2013.01); *F01P 7/16* (2013.01); *F01P 2007/146* (2013.01); *F01P 2060/04* (2013.01)

(58) Field of Classification Search
CPC .. F16K 11/0876; F01P 3/20; F01P 7/16; F01P 2007/146; F01P 2060/04
(Continued)

(56) References Cited

U.S. PATENT DOCUMENTS 9,803,764 B2 * 10/2017  Chang ................... F16K 31/524
2016/0010536 A1 *  1/2016  Murakami ............ F16K 11/076
                                                       137/625.44
(Continued)

FOREIGN PATENT DOCUMENTS

| JP | 6581367 B2 | 9/2019 |
| KR | 101896376 B1 | 9/2018 |
| KR | 20210022507 A | 3/2021 |

*Primary Examiner* — Hung Q Nguyen
*Assistant Examiner* — Anthony Donald Taylor, Jr.
(74) *Attorney, Agent, or Firm* — Lempia Summerfield Katz LLC

(57) ABSTRACT

A control valve includes: a valve housing; a coolant port formed in the valve housing and through which coolant inflows; an oil cooler port formed in the valve housing; a heater port formed in the valve housing; a radiator port formed in the valve housing; a bypass flow path through which the coolant port and the heater port communicate; and a ball valve, wherein the coolant port and the oil cooler port selectively communicate and the coolant port and the radiator port selectively communicate while the ball valve rotates inside the valve housing, wherein a valve inlet which communicates with the coolant port is formed in the ball valve, and a first section outlet, a second section outlet, and a third section outlet, which selectively communicate with the valve inlet are formed consecutively on an outer periphery of the ball valve.

13 Claims, 13 Drawing Sheets

(51) Int. Cl.
  *F01P 7/16* (2006.01)
  *F01P 7/14* (2006.01)
(58) Field of Classification Search
  USPC .......................................................... 165/101
  See application file for complete search history.

(56) References Cited

U.S. PATENT DOCUMENTS

| | | | | |
|---|---|---|---|---|
| 2016/0363036 | A1* | 12/2016 | Imasaka | F01P 7/14 |
| 2017/0321595 | A1* | 11/2017 | Jang | F01P 7/16 |
| 2018/0051815 | A1* | 2/2018 | Murakami | F01P 7/14 |
| 2018/0149073 | A1* | 5/2018 | Shen | F16K 31/043 |
| 2019/0072191 | A1* | 3/2019 | Shen | F01P 7/165 |
| 2019/0186641 | A1* | 6/2019 | Seko | F16K 5/201 |
| 2019/0219179 | A1* | 7/2019 | Sato | F16K 5/0689 |
| 2019/0308489 | A1* | 10/2019 | Spies | F25B 41/35 |
| 2020/0114725 | A1* | 4/2020 | Kanzaki | F01P 7/165 |
| 2021/0140555 | A1* | 5/2021 | Nomura | F01P 7/14 |

* cited by examiner

First mode

Second mode

Third mode

Fourth mode

Fifth mode

CONTROL VALVE AND COOLING SYSTEM FOR A VEHICLE

CROSS-REFERENCE TO RELATED APPLICATION

This application claims priority to and the benefit of Korean Patent Application No. 10-2021-0154444 filed in the Korean Intellectual Property Office on Nov. 11, 2021, the entire contents of which are incorporated herein by reference.

BACKGROUND

(a) Field

The present disclosure relates to a control valve and a cooling system for a vehicle including the same.

(b) Description of the Related Art

In general, an engine generates heat energy while providing power through fuel combustion to drive a vehicle, and coolant in the vehicle absorbs heat energy while circulating the engine, a heater, and a radiator, and discharges the absorbed heat energy to the outside of the vehicle or engine.

When coolant temperature of the engine is overheated, knocking occurs, and ignition timing must be adjusted to suppress the knocking, so engine performance may be deteriorated. In addition, if temperature of lubricant is excessively high, its viscosity may be lowered and a lubrication function may be deteriorated.

Conversely, if the coolant temperature of the engine is excessively low, viscosity of oil increases and frictional force increases, which cause fuel consumption increase. In addition, as temperature of the exhaust gas rises slowly, activation time of a catalyst may be prolonged, and quality of the exhaust gas may be deteriorated. In addition, it may take a long time for the heater to function normally, which may cause inconvenience to a user.

Particularly, since viscosity of an engine oil increases during cold start of the engine such as in winter, an output and efficiency of the engine are lowered, resulting in deterioration of fuel efficiency. In addition, since temperature of a combustion chamber is low, there is a problem that the exhaust gas is excessively discharged due to incomplete combustion.

Therefore, a technology is used to control several cooling elements through one valve, such as maintaining a high temperature of the coolant in a specific part of the engine and keeping the other parts low depending on operation modes of the vehicle.

In other words, research has been conducted on a technology in which one control valve controls each coolant passing through the radiator, the heater, an EGR cooler, an oil cooler, or the engine. Research is underway to simplify the configuration of the control valve to simplify the layout of a cooling system and to optimize an opening strategy of the control valve.

In addition, as element technologies of the vehicle's cooling system increases, the complexity of the cooling system increases, and accordingly, the layout of the cooling system is also complicated. We have discovered that an effect of the element technology of each cooling system overlaps with that of an element technology of other cooling systems, and there are cases in which a targeted effect cannot be obtained. Therefore, we have found that research to realize the optimization of functional elements including the layout of the cooling system is desired.

The above information disclosed in this Background section is only to enhance understanding of the background of the present disclosure, and therefore it may contain information that does not form the prior art that is already known to a person of ordinary skill in the art.

SUMMARY

The present disclosure provides a control valve of a cooling system for a vehicle having advantages of simplifying a configuration of the control valve applied to the cooling system to simplify a layout of the cooling system and to optimize the opening strategy of the control valve.

In an embodiment of the present disclosure, a control valve includes: a valve housing; and a coolant port formed in the valve housing and through which coolant inflows. The control valve further includes: an oil cooler port formed in the valve housing; and a heater port formed in the valve housing; and a radiator port formed in the valve housing. The control valve further includes: a bypass flow path through which the coolant port and the heater port communicate; and a ball valve. In particular, while the ball valve rotates inside the valve housing, the coolant port and the oil cooler port may selectively communicate, and the coolant port and the radiator port may also selectively communicate. In one embodiment, a valve inlet may be formed in the ball valve and communicates with the coolant port. In addition, a first section outlet, a second section outlet, and a third section outlet, which selectively communicate with the valve inlet, may be formed consecutively on an outer periphery of the ball valve.

The first section outlet may be formed by a predetermined section along a rotating direction of the ball valve, the second section outlet may extend from the first section outlet and is formed wider than a vertical direction width of the first section outlet, and the third section outlet may extend from the second section outlet and may be formed narrower than a vertical direction width of the second section outlet.

The first section outlet may be formed below a central axis perpendicular to a rotation shaft of the ball valve.

A rib may be formed at the second section outlet.

The oil cooler port and the radiator port may be spaced apart by a predetermined angle about a rotation shaft of the ball valve.

A central axis of the oil cooler port may pass through a center of the ball valve.

A central axis perpendicular to a rotation shaft of the ball valve may offset from a central axis of the oil cooler port by a predetermined angle.

In another embodiment of the present disclosure, a cooling system for a vehicle includes: an oil cooler disposed on a first connection line selectively connected to the oil cooler port; and a heater disposed on a second connection line selectively connected to the heater port. The cooling system further includes: a radiator disposed on a third connection line selectively connected to the radiator port; and a controller configured to control operation of the control valve to operate in any one mode among a plurality of modes for selectively exhausting coolant supplied from an engine to the first to third connection lines through the control valve.

The plurality of modes may include first, second, third, fourth and fifth modes, which are sequentially performed as the ball valve rotates at a predetermined angle from a reference position.

In the first mode, the coolant inflowing to the coolant port may be exhausted to the third connection line through the radiator port, and may also be exhausted to the second connection line through the bypass flow path and the heater port.

In the second mode, the coolant inflowing to the coolant port may be exhausted only to the second connection line through the bypass flow path.

In the third mode, the coolant inflowing to the coolant port may be exhausted to the first connection line through the oil cooler port, and may also be exhausted to the second connection line through the bypass flow path and the heater port.

In the fourth mode, the coolant inflowing to the coolant port may be exhausted to the first connection line through the oil cooler port, exhausted to the second connection line through the bypass flow path and the heater port, and further exhausted to the third connection line through the radiator port.

In the fifth mode, the coolant inflowing to the coolant port may be exhausted to the first connection line through the oil cooler port, exhausted to the second connection line through the bypass flow path and heater port, and further exhausted to the third connection line through the radiator port.

An amount of coolant exhausted to the third connection line may be maximum.

According to the control valve of the cooling system for the vehicle of an embodiment of the present disclosure as described above, it is possible to reduce or minimize the entire size and weight of the control valve by minimizing the size of the ball valve rotatably installed in the valve housing, thereby facilitating assembly inside the engine room and simplifying packaging.

In addition, it is possible to optimize control of the cooling system by always bypassing the flow rate of the coolant supplied to the heater.

BRIEF DESCRIPTION OF THE DRAWINGS

These drawings are for reference in describing embodiments of the present disclosure, and the technical scope of the present disclosure should not be construed as being limited to the accompanying drawings.

DETAILED DESCRIPTION

Figure 1:
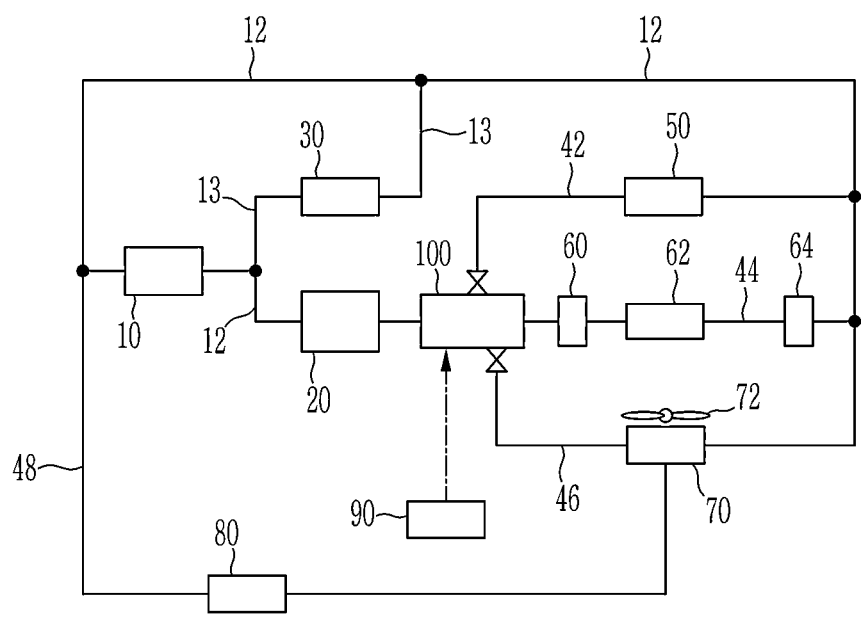
FIG. 1 is a schematic diagram illustrating a configuration of a cooling system to which a control valve according to an embodiment of the present disclosure is applied.

The present disclosure is described more fully hereinafter with reference to the accompanying drawings, in which embodiments of the present disclosure are shown. As those having ordinary skill in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

In addition, since the size and thickness of each component shown in the drawing are arbitrarily indicated for convenience of explanation, the present disclosure is not necessarily limited to the drawing, and in order to clearly express various parts and regions, the thickness is enlarged.

When a component, device, element, or the like of the present disclosure is described as having a purpose or performing an operation, function, or the like, the component, device, or element should be considered herein as being "configured to" meet that purpose or to perform that operation or function.

Hereinafter, a control valve of a cooling system for a vehicle according to an embodiment of the present disclosure is described in detail with reference to the accompanying drawings.

First, a cooling system for a vehicle to which a control valve according to an embodiment of the present disclosure is applied is described below.

FIG. 1 is a schematic diagram illustrating a configuration of a cooling system to which a control valve according to an embodiment of the present disclosure is applied.

As shown in FIG. 1, the cooling system for the vehicle may include an engine 20 through which coolant is circulated through operation of a water pump 10, an EGR cooler 30, an oil cooler 50, a heater 60, and a radiator 70, which are respectively connected to each other by a coolant line 12.

The water pump 10 pumps the coolant to the engine 20 and the EGR cooler 30 through the coolant line 12, respectively. The coolant pumped by the water pump 10 is distributed to the engine 20 and the EGR cooler 30.

The EGR cooler 30 may be fluidly connected to the coolant line 12 through the EGR coolant line 13 branched from the coolant line 12 so that the coolant pumped from the water pump 10 is supplied.

After passing through the EGR cooler 30, the EGR coolant line 13 may be fluidly connected to the coolant line 12 again.

Accordingly, the coolant pumped through the operation of the water pump 10 may be supplied to the engine 20 through the coolant line 12, and may be supplied to the EGR cooler 30 through the EGR coolant line 13.

The cooling system according to an exemplary embodiment of the present disclosure is provided with a control valve 100 for distributing the coolant exhausted from the engine 20 to the heater 60, the radiator 70, and the oil cooler 50.

The control valve 100 may be operated according to a control signal of a controller 90. To this end, the controller 90 may be implemented as at least one microprocessor operated by a predetermined program, and the predetermined program may include a series of instructions for performing a control method according to an exemplary embodiment of the present disclosure to be described later.

The control valve 100 is fluidly connected to the heater 60, the radiator 70, and the oil cooler 50 through a first connection line 42, a second connection line 44, and a third connection line 46, respectively.

In the first connection line 42, the coolant distributed from the control valve 100 to the oil cooler 50 flows. In the second connection line 44, the coolant distributed from the control valve 100 to the heater 60 flows. In addition, the coolant distributed from the control valve 100 flows to the radiator 70 through the third connection line 46.

Here, the radiator 70 may be disposed at the front of the vehicle, and the cooling fan 72 may be mounted at the rear of the radiator 70.

The control valve 100 according to an embodiment of the present disclosure may selectively open and close the first connection line 42 and the third connection line 46 by a control signal of the controller 90. The control valve 100 may control opening rates of the first connection line 42 and the third connection line 46 according to a rotation position of a ball valve 300 installed inside the control valve 100.

In addition, a bypass flow path 250 connecting the engine 20 and the heater 60 is formed in the control valve 100 according to an embodiment of the present disclosure. Accordingly, the coolant distributed from the engine 20 always flows to the heater 60 through the bypass flow path 250.

Meanwhile, an exhaust heat recovery device 62 may be provided downstream of the heater 60 disposed on the second connection line 44. The exhaust heat recovery device 62 recovers heat included in the exhaust gas exhausted from the engine 20 through the coolant.

An auxiliary water pump 64 may be provided downstream of the exhaust heat recovery device 62 disposed on the second connection line 44. The coolant of the second connection line 44 is pumped to the coolant line 12 by the operation of the auxiliary water pump 64.

In addition, a reservoir tank 80 may be provided in an auxiliary connection line 48 between the radiator 70 and the water pump 10. The reservoir tank 80 may store the coolant that has been cooled by and flows in from the radiator 70. Here, the auxiliary connection line 48 may be branched from the third connection line 46 on which the radiator 70 is disposed and may merge into the second connection line 44 on which the heater 60 is disposed.

Next, a control valve according to an embodiment of the present disclosure is described in detail with reference to the accompanying drawings.

Figure 2:
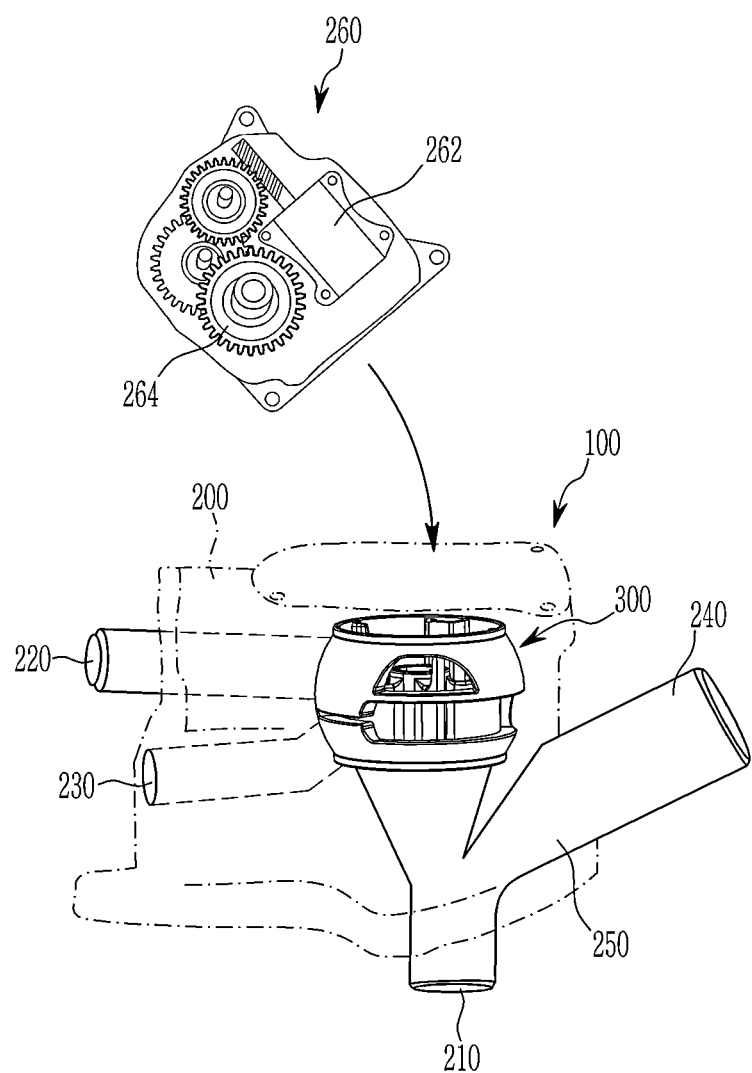
FIG. 2 is a diagram illustrating a configuration of a control valve and a valve housing according to an embodiment of the present disclosure.
Figure 3:
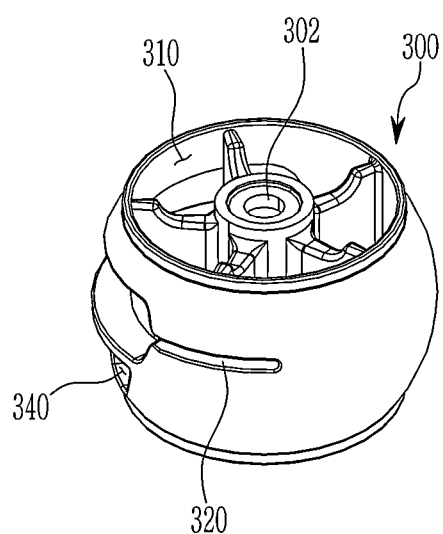
FIG. 3 and FIG. 4 are perspective views illustrating a configuration of a control valve according to an embodiment of the present disclosure.
Figure 4:
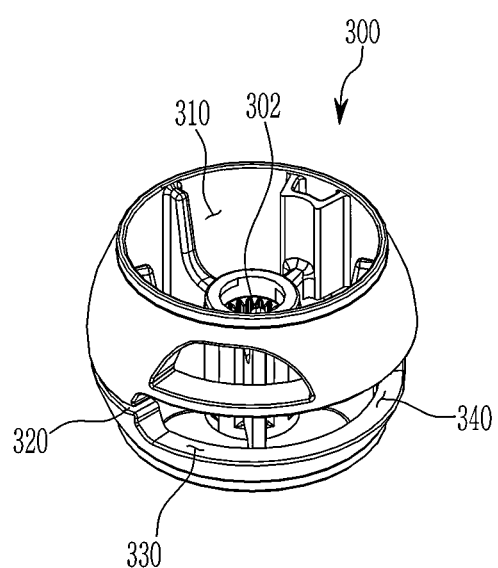
Figure 5:
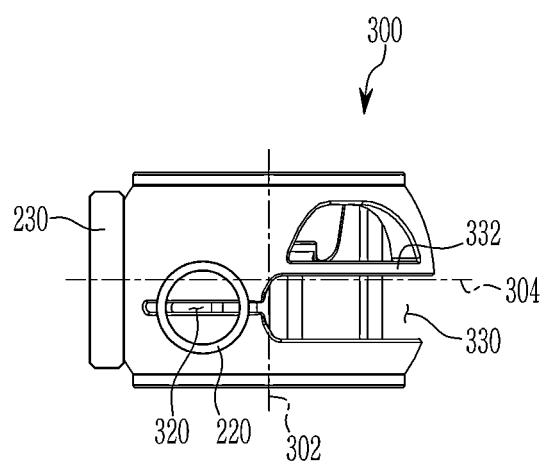
FIG. 5 and FIG. 6 are side views illustrating a configuration of a control valve according to an embodiment of the present disclosure.
Figure 6:
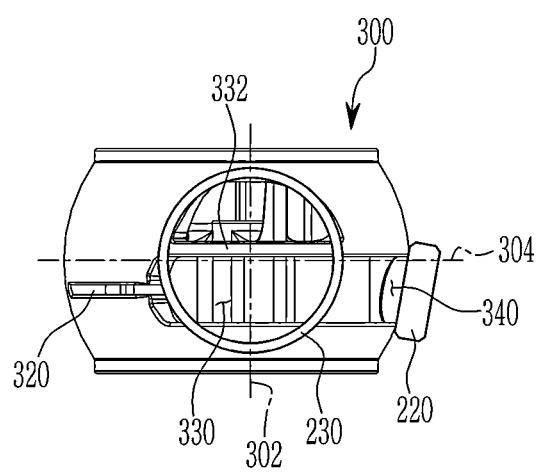

FIG. 2 is a drawing illustrating a configuration of a control valve and a valve housing according to an embodiment of the present disclosure. FIGS. 3 and 4 are perspective views illustrating a configuration of the control valve 100 according to an embodiment of the present disclosure. FIGS. 5 and 6 are side views illustrating a configuration of the control valve 100 according to an embodiment of the present disclosure.

As shown in FIG. 2 to FIG. 6, the control valve 100 may include a valve housing 200 and a ball valve 300 rotatably disposed inside the valve housing 200. In an embodiment of the present disclosure, the ball valve 300 is installed inside the valve housing 200 so that rotations in both directions (e.g., clockwise and counter-clockwise directions) are possible only within a predetermined angle range (e.g., 10 degrees to 280 degrees).

Referring to FIG. 2, in the valve housing 200, a coolant port 210 communicating with a coolant line 12 may be formed, an oil cooler port 220 communicating with a first connection line 42 on which an oil cooler 50 is disposed may be formed, a radiator port 230 communicating with a third connection line 46 on which a radiator 70 is disposed may be formed, and a heater port 240 communicating with a second connection line 44 on which a heater 60 is disposed may be formed.

A driving unit 260 for supplying power for rotating the ball valve 300 is disposed on the upper portion of the valve housing 200. The driving unit 260 may include a motor 262 that generates power by electrical energy, and may also include a speed reducer 264 that decelerates the speed of the motor 262 and increases torque.

In addition, a bypass flow path 250 which fluidly connects the coolant port 210 and the heater port 240 is formed in the valve housing 200. Accordingly, the coolant which inflows through the coolant port 210 is always exhausted to the second connection line 44 through the bypass flow path 250.

Referring to FIG. 3 to FIG. 6, the ball valve 300 is formed in a partially spherical shape with an empty interior. An upper part and a lower part of the ball valve 300 are cut to form a partial spherical shape. A valve inlet 310 that is fluidly connected to the coolant port 210 is formed at an opened lower portion of the ball valve 300. And a rotation shaft 302 connected to the speed reducer 264 is formed inside the ball valve 300.

A first section outlet 320, a second section outlet 330, and a third section outlet 340 are formed on an outer periphery of the ball valve 300 along the rotating direction of the ball valve 300. The first to third section outlets (320, 330, 340) selectively communicate with the valve inlet 310 formed at an lower portion of the ball valve 300.

The first section outlet 320 to the third section outlet 340 may selectively communicate with the oil cooler port 220, and the first section outlet 320 and the second section outlet 330 may selectively communicate with the radiator port 230. Therefore, the coolant inflowing through the valve inlet 310 is selectively exhausted through the first section outlet 320 to the third section outlet 340.

The first section outlet 320 may be formed by a predetermined section along the rotating direction of the ball valve 300. The second section outlet 330 may extend from the first section outlet 320 and may be formed wider than the vertical direction width (i.e., a width measured in a vertical direction of the ball valve 300) of the first section outlet 320. Thus, the width of the second section outlet 330 is wider than a width of the first section outlet 320 measured along the vertical direction. The third section outlet 340 may extend from the second section outlet 330 and may be formed narrower than the vertical direction width of the second section outlet 330. In one embodiment, the first section outlet 320 may be formed below a central axis 304 perpendicular to the rotation shaft 302 of the ball valve 300. In another embodiment, the second section outlet 330 may be formed above and below the central axis 304, and the third section outlet 340 may be formed below the central axis 304.

For example, the first section outlet 320 may be formed in a narrow slot shape along the circumferential direction of the ball valve 300. The second section outlet 330 may be formed in an approximate circular shape with a vertical direction width wider than the first section outlet 320. In one embodiment, a rib 332 is formed in the second section outlet 330 along the circumferential direction of the ball valve 300 (or the rotating direction of the ball valve). The strength of the ball valve 300 may be reinforced by the rib 332. In addition, the third section outlet 340 may be formed in a slot shape with a vertical direction width which is wider than the vertical direction width of the first section outlet 320.

The diameter of the oil cooler port 220 may be formed in a size corresponding to the vertical direction width of the third section outlet 340, and the diameter of the radiator port 230 may be formed in a size corresponding to the vertical direction width of the second section outlet 330. In addition, the oil cooler port 220 and the radiator port 230 may be disposed to be spaced apart from each other at a predetermined angle around the rotation shaft of the ball valve 300.

Figure 7:
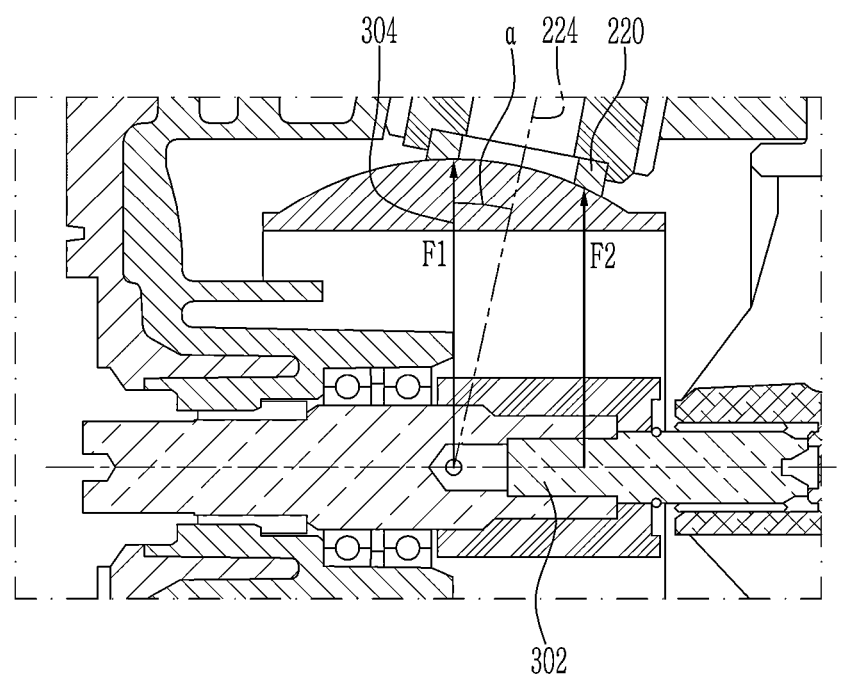
FIG. 7 is a cross-sectional view illustrating a partial configuration of a control valve according to an embodiment of the present disclosure.

FIG. 7 is a cross-sectional view illustrating a partial configuration of a control valve 100 according to an embodiment of the present disclosure.

Referring to FIG. 7, the central axis 224 of the oil cooler port 220 passes through the center of the ball valve 300. In addition, the central axis 304 perpendicular to the rotation shaft 302 of the ball valve 300 may be offset by a predetermined angle from the central axis 224 of the oil cooler port 220. As such, by disposing the central axis 304 of the ball valve 300 and the central axis 224 of the oil cooler port 220 to be offset by a predetermined angle, the overall size of the valve housing 200 may be reduced or minimized.

Hereinafter, the operation of the cooling system according to an embodiment of the present disclosure as described above is described in detail with reference to the accompanying drawings.

Figure 8:
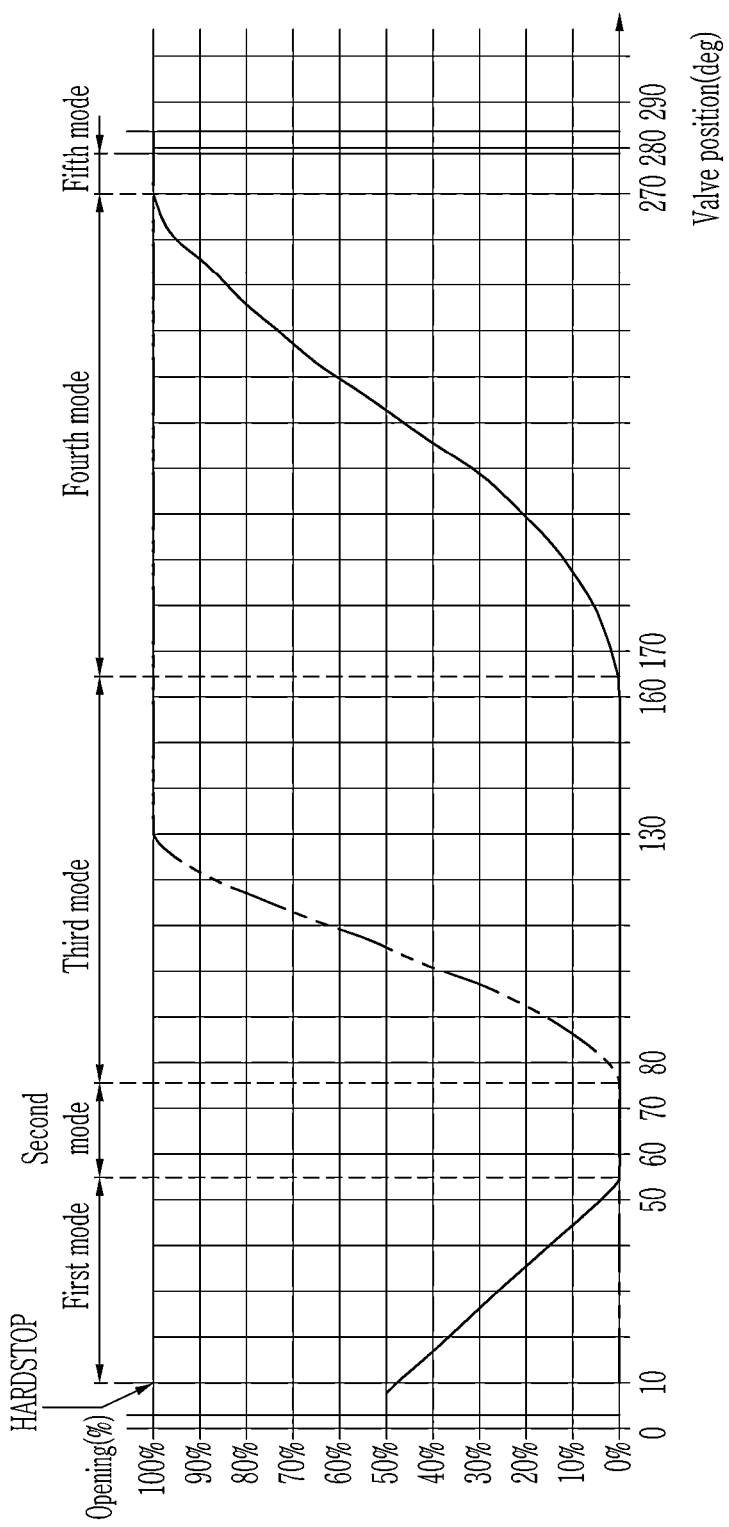
FIG. 8 is a graph for explaining an operation of a control valve according to an embodiment of the present disclosure.

FIG. 8 is a graph for explaining an operation of a control valve according to an embodiment of the present disclosure. In addition, FIGS. 9A to 9E are exploded views of an outer peripheral surface of a ball valve spread out on a plane according to an embodiment of the present disclosure. In other words, FIGS. 9A to 9E are drawings explaining the operation of the valve in each mode (first mode to fifth mode) shown in FIG. 8.

A cooling system for a vehicle according to an embodiment of the present disclosure may operate in any one mode of a plurality of modes based on the vehicle's operating conditions including the temperature of coolant and the outside temperature.

In an embodiment of the present disclosure, as the ball valve 300 rotates at a predetermined angle from the reference position, the first mode to the fifth mode may be sequentially performed. For example, the first, second, third, fourth and fifth modes may be sequentially performed while the ball valve 300 rotates anticlockwise (i.e., counter-clockwise) from the reference position.

The first mode is a mode in which the coolant port 210 and the radiator port 230 communicate through the ball valve 300 to prevent the coolant inflowing from the engine 20 from overheating when a failure occurs in the motor 262 of the control valve 100 (e.g., when the motor 262 does not rotate in either direction due to a failure of the reducer 264, etc.). In the first mode, the ball valve 300 is in a range of a first predetermined angle (e.g., 55 degrees) from a reference position (e.g., 10 degrees).

Figure 9A:
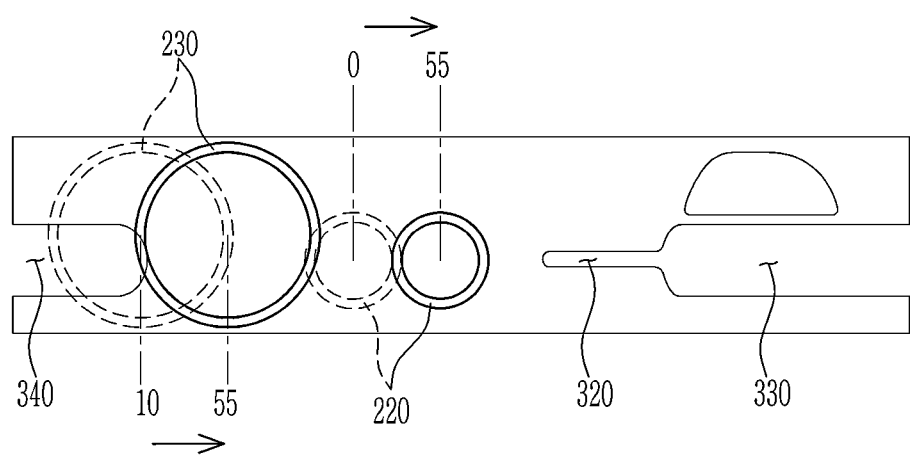
FIGS. 9A to 9E are exploded views of an outer peripheral surface of a ball valve spread out on a plane according to an embodiment of the present disclosure.

Referring to FIG. 9A, in the first mode, the radiator port 230 and the first section outlet 320 of the ball valve 300 communicate, and the coolant inflowing to the coolant port 210 is exhausted from the valve inlet 310 of the ball valve 300 to the third connection line 46 where the radiator 70 is disposed through the first section outlet 320 and the radiator port 230. In addition, since the coolant port 210 and the heater port 240 are always communicated through a bypass flow path 250, some coolant inflowing from the engine 20 is exhausted through the bypass flow path 250 to the second connection line 44 where the heater 60 is disposed.

In the first mode, as the ball valve 300 rotates anticlockwise, the communication area between the first section outlet 320 and the radiator port 230 decreases. Accordingly, as the ball valve 300 rotates anticlockwise, the amount of coolant exhausted to the third connection line 46 decreases, and the amount of coolant exhausted to the second connection line 44 where the heater 60 is disposed through the bypass flow path 250 increases.

Figure 9B:
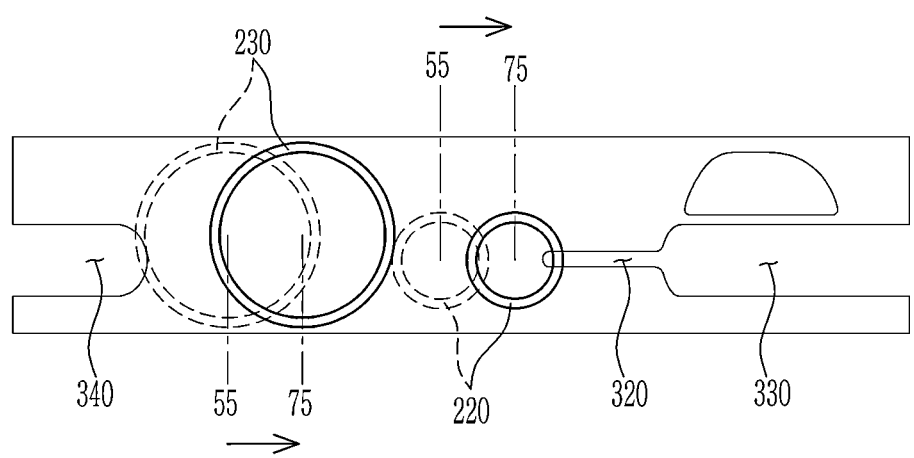

Referring to FIG. 9B, the second mode is a mode to supply the coolant that is heated after cooling the engine 20 to the heater 60. In the second mode, the ball valve 300 ranges from a first predetermined angle (e.g., 55 degrees) to a second predetermined angle (e.g., 75 degrees). In the second mode, the first section outlet 320 to the third section outlet 340 of the ball valve 300 do not communicate with the radiator port 230 and the heater port 240. In addition, since the coolant port 210 and the heater port 240 are always communicated through the bypass flow path 250, all coolant inflowing from engine 20 is exhausted to the heater 60 through the bypass flow path 250.

The third mode is a mode to control the temperature of the oil cooler 50 by using the coolant that is heated after cooling the engine 20. In the third mode, the ball valve 300 is in the range of a second predetermined angle (e.g., 75 degrees) to a third predetermined angle (e.g., 165 degrees).

Figure 9C:
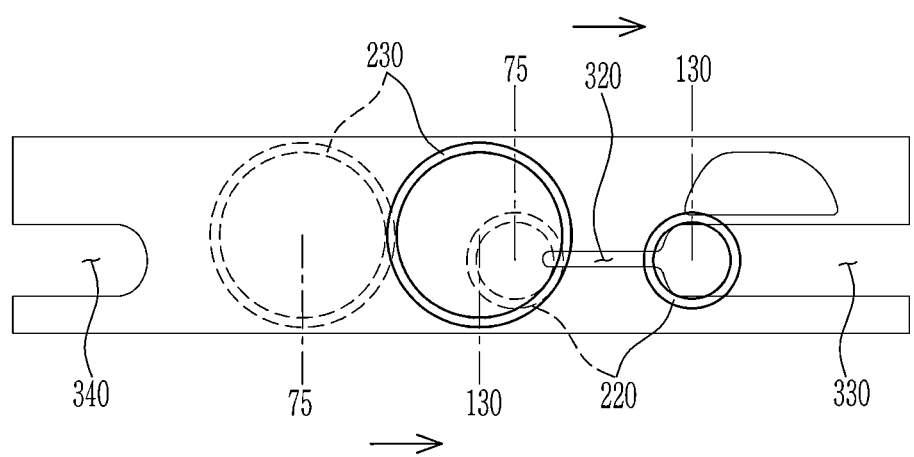

Referring to FIG. 9C, in the third mode, the first section outlet 320 and the second section outlet 330 are selectively communicated with the oil cooler port 220 according to the rotation of the ball valve 300, and the coolant inflowing to the coolant port 210 is exhausted from the valve inlet 310 to the first connection line 42 where the oil cooler 50 is disposed through the first section outlet (320, or the second section outlet 330) and the oil cooler port 220. In addition, since the coolant port 210 and the heater port 240 are always communicated through the bypass flow path 250, some coolant inflowing from the engine 20 is exhausted to the heater 60 through the bypass flow path 250.

In the third mode, as the ball valve 300 rotates anticlockwise, the communication area between the oil cooler port 220 and the first section outlet 320 increases. In addition, as the oil cooler port 220 communicates with the second section outlet 330, the communication area between the oil cooler port 220 and the second section outlet 330 is maximized. Accordingly, as the ball valve 300 rotates anticlockwise, the amount of coolant exhausted to the first connection line 42 increases, and the amount of coolant exhausted to the second connection line 44 where the heater 60 is disposed through the bypass flow path 250 decreases.

The fourth mode is a mode to control the temperature of the oil cooler 50 using the coolant that is heated after cooling the engine 20, and to cool some coolant through radiator 70. In the fourth mode, the ball valve 300 is in the range of a third predetermined angle (e.g., 165 degrees) to a fourth predetermined angle (e.g., 270 degrees).

Figure 9D:
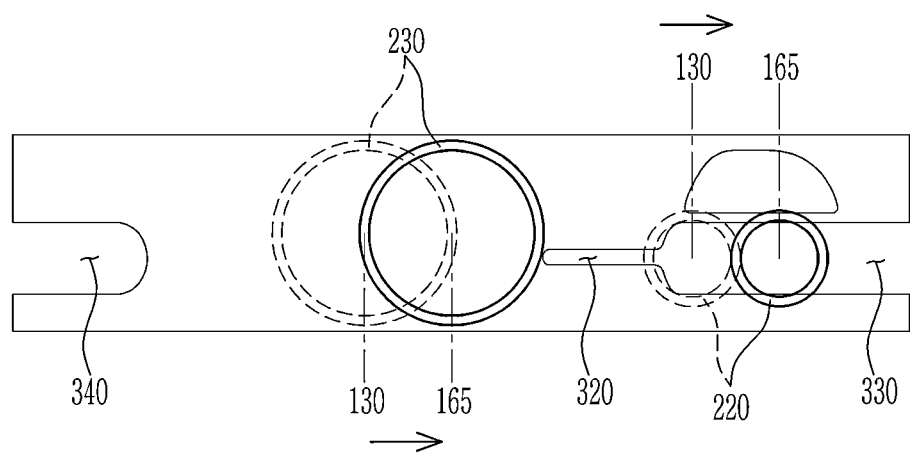

Referring to FIG. 9D, in the fourth mode, the second section outlet 330 and the third section outlet 340 selectively communicate with the oil cooler port 220 according to the rotation of the ball valve 300, and the first section outlet 320 and the second section outlet 330 selectively communicate with the radiator port 230. Accordingly, the coolant inflowing to the coolant port 210 is exhausted from the valve inlet 310 to the first connection line 42 where the oil cooler 50 is disposed through the second section outlet (330, or the third section outlet 340) and the oil cooler port 220. In addition, the coolant inflowing to the coolant port 210 is exhausted from the valve inlet 310 to the third connection line 46 where the radiator 70 is disposed through the first section outlet (320, or the second section outlet 330) and the radiator port 230. In addition, since the coolant port 210 and the heater port 240 are always communicated through the bypass flow path 250, some coolant inflowing from the engine 20 is exhausted to the heater 60 through the bypass flow path 250.

In the fourth mode, as the ball valve 300 rotates, the communication area between the radiator port 230 and the first section outlet 320 increases. In addition, as the radiator port 230 communicates with the second section outlet 330, the communication area between the radiator port 230 and the second section outlet 330 increases. Accordingly, as the ball valve 300 rotates anticlockwise, the amount of coolant exhausted to the third connection line 46 increases, and the amount of coolant exhausted to the second connection line 44 where the heater 60 is disposed through the bypass flow path 250 decreases relatively.

The fifth mode is a mode to cool the coolant that is heated after cooling the engine 20 as much as possible, and if necessary, a mode in which the coolant port 210 and the radiator port 230 are communicated through the ball valve 300 to prevent the coolant inflowing from the engine 20 from overheating, when a failure occurs in the motor 262 of the control valve 100 (e.g., when motor 262 does not rotate in either direction due to a failure in reducer 264, etc.). In the fifth mode, the ball valve 300 ranges from a fourth predetermined angle (e.g., 270 degrees) to a fifth predetermined angle (e.g., 280 degrees).

Figure 9E:
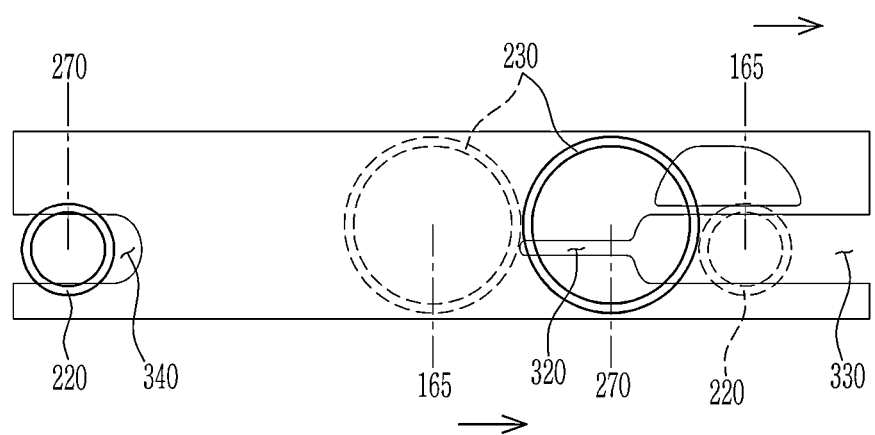

Referring to FIG. 9E, in the fifth mode, the third section outlet 340 and the oil cooler port 220 are communicated according to the rotation of the ball valve 300, and the second section outlet 330 and the radiator port 230 are communicated. Accordingly, the coolant inflowing to the coolant port 210 is exhausted from the valve inlet 310 to the first connection line 42 where the oil cooler 50 is disposed through the third section outlet 340 and the oil cooler port 220. In addition, the coolant inflowing to the coolant port 210 is exhausted from the valve inlet 310 to the third connection line 46 where the radiator 70 is disposed through the second section outlet 330 and the radiator port 230. Here, since the area communicated with the radiator port 230 and the second section outlet 330 is maximized, the amount of coolant exhausted to the third connection line is maximized. In addition, since the coolant port 210 and the heater port 240 are always communicated through the bypass flow path 250, some coolant inflowing from the engine 20 is exhausted to the heater 60 through the bypass flow path 250.

When a failure occurs in the motor 262 of the driving unit 260 and the motor 262 can rotate in only one direction, the cooling system may operate in the first mode or the fifth mode. In other words, when a failure occurs in the motor 262 of the driving unit 260 and the motor 262 can rotate in only one direction, the controller 90 operates in the first mode or the fifth mode by rotating it up to the maximum angle in the direction in which the motor 262 of the driving unit 260 can rotate.

An embodiment in which the first to fifth modes are sequentially performed while the control valve 100 rotates clockwise is described below.

Here, if the motor 262 cannot be rotated in the clockwise direction due to an abnormal cause, the controller 90 can rotate the motor 262 to the maximum angle that can be rotated anticlockwise to control it to operate in the fifth mode. Conversely, if the motor 262 cannot be rotated counterclockwise due to an abnormal cause, the controller 90 may rotate the motor 262 to the maximum angle that can be rotated clockwise to operate in the first mode.

According to the control valve and the cooling system for a vehicle including the same according to an embodiment of the present disclosure as described above, it is possible to minimize the entire size and weight of the control valve by minimizing the size of the ball valve rotatably installed in the valve housing, and through this, assembling inside the engine room may be facilitated and packaging may be simplified.

In addition, since coolant can be supplied to the oil cooler, heater, and radiator through the rotation of the ball valve, the opening strategy of the control valve can be simplified and optimized.

In addition, even if a failure occurs in which the motor of the driving unit can rotate in only one direction, the coolant can be supplied to the radiator, preventing the coolant from overheating.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the present disclosure.

DESCRIPTION OF SYMBOLS

10: Water pump
12: Coolant line
13: EGR coolant line
20: Engine
30: EGR cooler
42: First connection line
44: Second connection line
46: Third connection line
48: Auxiliary connection line
50: Oil cooler
60: Heater
62: Exhaust heat recovery device
64: Auxiliary water pump
70: Radiator
72: Cooling fan
80: Reservoir tank
90: Controller
100: Control valve
200: Valve housing
210: Coolant port
220: Oil cooler port
230: Radiator port
240: Heater port
250: Bypass flow path
260: Driving unit
262: Motor
264: Reducer
300: Ball valve
302: Rotation shaft
304: Central axis
310: Valve inlet
320: First section outlet
330: Second section outlet
332: Rib
340: Third section outlet
350: Bypass flow path

What is claimed is:

1. A control valve comprising:
a valve housing;
a coolant port formed in the valve housing through which coolant flows;
an oil cooler port formed in the valve housing;
a heater port formed in the valve housing;
a radiator port formed in the valve housing;

a bypass flow path through which the coolant port and the heater port communicate with each other; and a ball valve formed with a valve inlet configured to communicate with the coolant port, wherein:

when the ball valve rotates inside the valve housing, the coolant port and the oil cooler port selectively communicate with each other, and the coolant port and the radiator port selectively communicate with to each other, the ball valve includes a first section outlet, a second section outlet, and a third section outlet, which each communicate with the valve inlet, formed consecutively along an outer periphery of the ball valve, a central axis of the oil cooler port passes through a center of the ball valve, and a central axis of the ball valve perpendicular to a rotation shaft of the ball valve is offset from the central axis of the oil cooler by a predetermined angle.

2. The control valve of claim 1, wherein:

the first section outlet is formed by a predetermined section along a rotating direction of the ball valve, the second section outlet extends from the first section outlet and is formed wider than a vertical direction width of the first section outlet, and the third section outlet extends from the second section outlet and is formed narrower than a vertical direction width of the second section outlet.

3. The control valve of claim 2, wherein:

the first section outlet is formed below the central axis of the ball valve perpendicular to the rotation shaft of the ball valve.

4. The control valve of claim 2, wherein:

a rib is formed at the second section outlet.

5. The control valve of claim 1, wherein:

the oil cooler port and the radiator port are spaced by a predefined angle about the rotation shaft of the ball valve.

6. A cooling system comprising the control valve according to claim 1, the cooling system comprising:

an oil cooler disposed on a first connection line selectively connected to the oil cooler port;

a heater disposed on a second connection line selectively connected to the heater port;

a radiator disposed on a third connection line selectively connected to the radiator port; and a controller configured to control an operation of the control valve to operate in any one mode among a plurality of modes for selectively exhausting coolant supplied from an engine to the first, second, and third connection lines through the control valve.

7. The cooling system of claim 6, wherein:

the plurality of modes includes a first mode, a second mode, a third mode, a fourth mode, and a fifth mode, which are sequentially utilized as the ball valve rotates at a predefined angle from a reference position.

8. The cooling system of claim 7, wherein:

in the first mode, the coolant flowing through the coolant port is exhausted to the third connection line through the radiator port, and exhausted to the second connection line through the bypass flow path and the heater port.

9. The cooling system of claim 7, wherein:

in the second mode, the coolant flowing through the coolant port is exhausted only to the second connection line through the bypass flow path.

10. The cooling system of claim 7, wherein:

in the third mode, the coolant flowing through the coolant port is exhausted to the first connection line through the oil cooler port, and exhausted to the second connection line through the bypass flow path and the heater port.

11. The cooling system of claim 7, wherein:

in the fourth mode, the coolant flowing through the coolant port is exhausted to the first connection line through the oil cooler port, exhausted to the second connection line through the bypass flow path and the heater port, and exhausted to the third connection line through the radiator port.

12. The cooling system of claim 7, wherein:

in the fifth mode, the coolant flowing through the coolant port is exhausted to the first connection line through the oil cooler port, exhausted to the second connection line through the bypass flow path and the heater port, and exhausted to the third connection line through the radiator port.

13. The cooling system of claim 12, wherein:

in the fifth mode, an amount of the coolant exhausted to the third connection line through the radiator port is a maximum amount.

* * * * *

UNITED STATES PATENT AND TRADEMARK OFFICE
CERTIFICATE OF CORRECTION

PATENT NO. : 12,247,670 B2
APPLICATION NO. : 17/975305
DATED : March 11, 2025
INVENTOR(S) : Junghoon Park et al.

Page 1 of 1

It is certified that error appears in the above-identified patent and that said Letters Patent is hereby corrected as shown below:

In the Claims

Column 11, Claim 1, Line 10 "to" should be removed

Signed and Sealed this
Fifteenth Day of April, 2025

Coke Morgan Stewart
*Acting Director of the United States Patent and Trademark Office*